United States Patent

Ohashi

[11] Patent Number: 5,943,013
[45] Date of Patent: Aug. 24, 1999

[54] DIRECTION FINDER

[75] Inventor: Yoshimasa Ohashi, Tokyo, Japan

[73] Assignee: Mitsubishi Denki Kabushiki Kaisha, Tokyo, Japan

[21] Appl. No.: 09/066,947

[22] Filed: Apr. 28, 1998

[30] Foreign Application Priority Data

Sep. 29, 1997 [JP] Japan .................................. 9-262992

[51] Int. Cl.$^6$ ...................................................... G01S 5/02
[52] U.S. Cl. ........................................................... 342/417
[58] Field of Search .................................. 342/417, 445, 342/359

[56] References Cited

U.S. PATENT DOCUMENTS 4,750,147 6/1988 Roy, III et al. ......................... 364/807
5,525,997 6/1996 Kwon ...................................... 342/174

FOREIGN PATENT DOCUMENTS 8-82662 3/1996 Japan .

OTHER PUBLICATIONS

"Multiple Emitter Location and Signal Parameter Estimation," Mar. 1986, IEEE Transactions on Antennas and Propagation, vol. AP–34, No. 3, pp. 276–280, Ralph O. Schmidt.

*Primary Examiner*—Gregory C. Issing
*Attorney, Agent, or Firm*—Burns, Doane, Swecker & Mathis, LLP

[57] ABSTRACT

In a direction finder, a frequency distribution of the directions in which radio sources are located is obtained in a manner that an antenna platform is rotated while setting an instantaneous field of view invariable or varying the same, whereby the above phenomenon is suppressed.

4 Claims, 7 Drawing Sheets

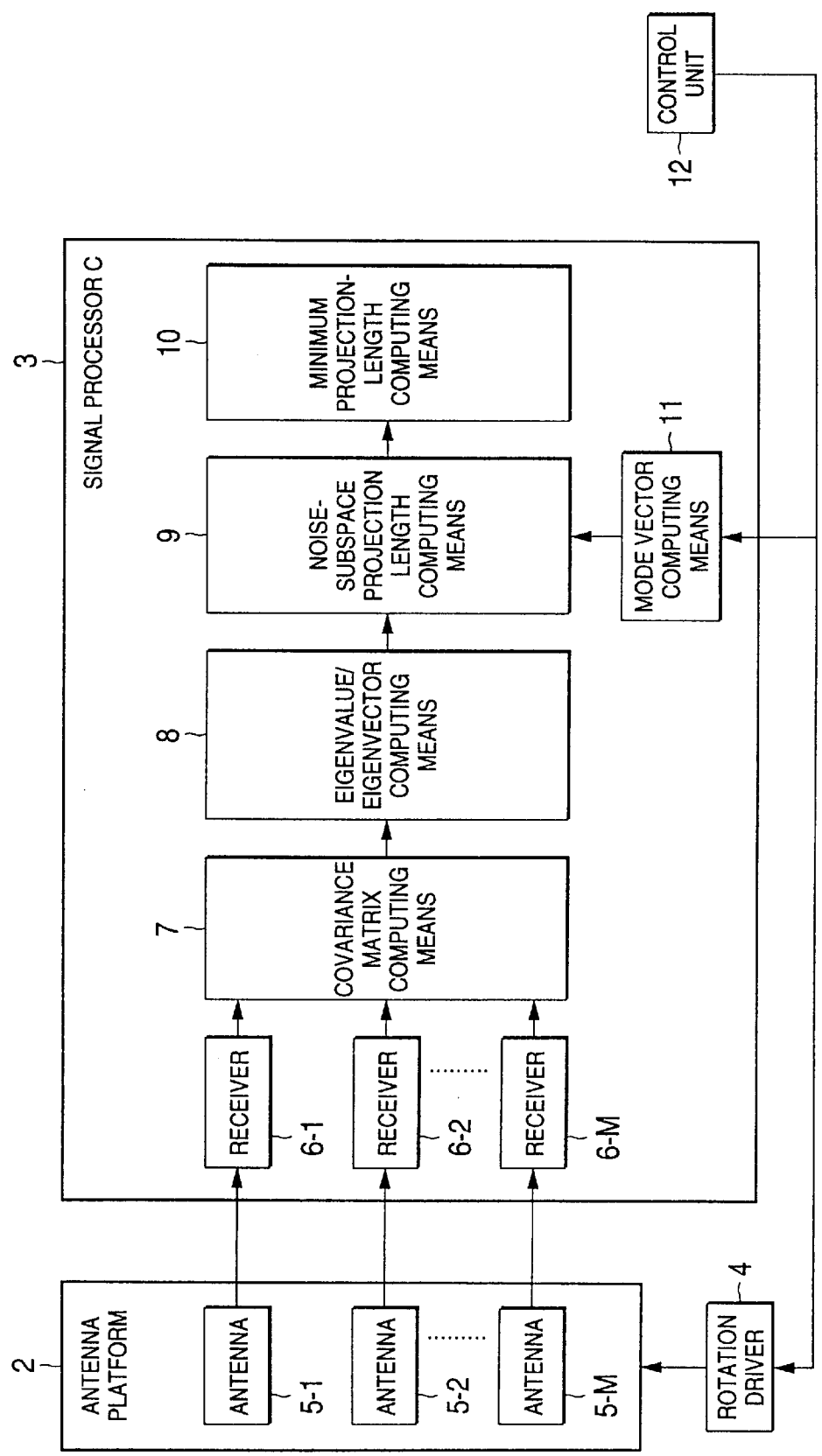
FIG. 5
(CONVENTIONAL)

FIG. 6
*(CONVENTIONAL)*
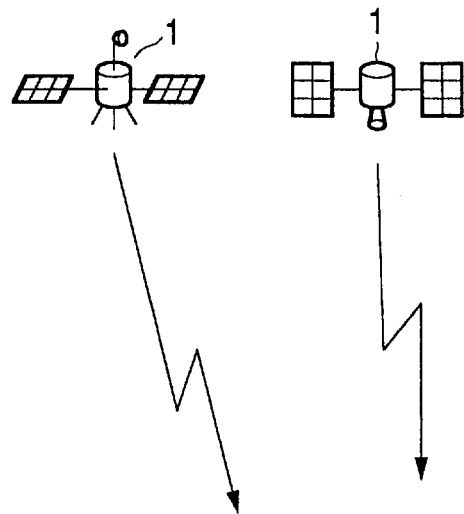
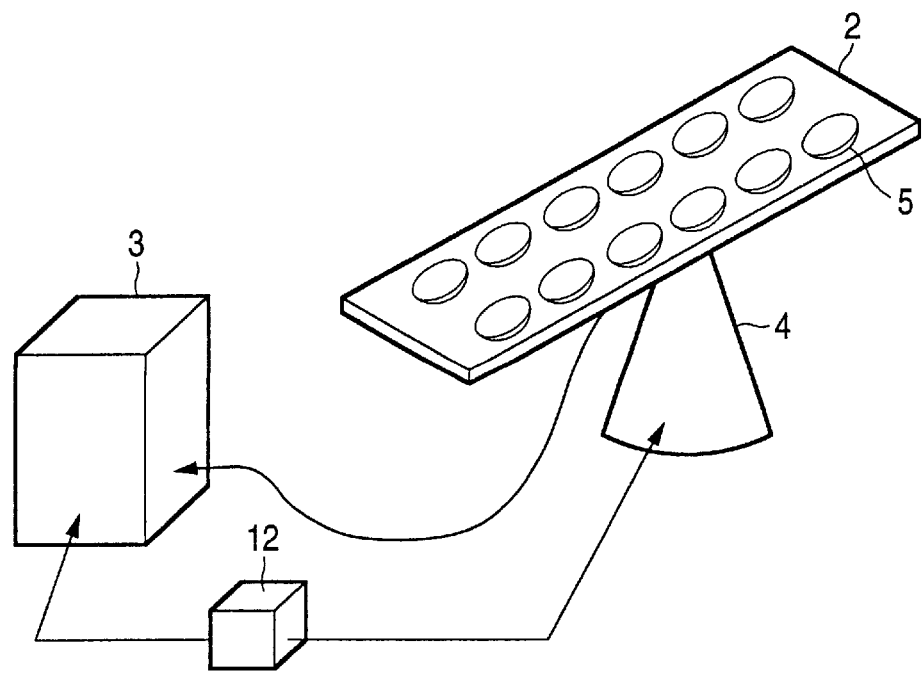

DIRECTION FINDER

BACKGROUND OF THE INVENTION

1. Field of the Invention

The present invention relates to a direction finder which is capable of accurately finding the directions of radio waves propagating from a plural number of radio sources.

2. Description of the Prior Art

The scheme of a prior direction finder is shown in FIG. 5. The direction finder shown is designed on the basis of the descriptions by Ralph O. Schmidt in his paper "Multiple Emitter Location and Signal Parameter Estimation", IEEE Transaction on Antenna and Propagation, Vol. AP-34, No. 3, March 1986.

An application of the direction finder is illustrated in FIG. 6.

In FIG. 5, reference numeral 2 is an antenna platform on which a plural number of antennas directed in the same direction are arrayed and mounted thereon; 3 is a signal processor C 3 for processing signals in a conventional manner; 4 is a rotation driver for rotating the an antenna platform 2; 5-1 to 5-M are antennas of the same specifications for receiving the radio waves from radio sources; 6-1 to 6-m are receivers having the same specifications for receiving the radio wave signals from the antennas 5-1 to 5-M and for amplifying and frequency-converting the radio wave signals; 7 is a covariance matrix computing means which simultaneously samples the output signals of the M number of receivers and snapshoots the results plural times, and computes a covariance matrix on the output signals; 8 is an eigenvalue/eigenvector computing means for computing eigenvalues and eigenvectors from the covariance matrix; 9 is a noise-subspace projection length computing means for projecting mode vectors to a noise subspace defined by the eigenvalues and the eigenvectors and for computing the projection length of each mode vector; 10 is a minimum projection-length computing means which scans each imaginary radio source in the subspace, and computes an azimuthal angle and an elevation angle of the imaginary radio source when the projection length output from the noise-subspace projection length computing means 9 is locally minimized; 11 is a mode vector computing means for computing a predicted mode vector predicted on the basis of the imaginary wave source; and 12 is a control unit for issuing predetermined rotation angle commands to the rotation driver 4 and the mode vector computing means 11.

In FIG. 6, reference numeral 1 designates artificial satellites as radio sources.

The operation of the direction finder thus configured will be described.

It is assumed that the number D of the artificial satellites 1 is smaller than the number M of the antennas 5 (D<M), and that the signals emitted from the radio sources are not correlated with one another. The output signals of the M number of the antennas 5 are input to the receivers 6 where those are amplified and frequency-converted.

The output signals of the receivers 6 are input to the covariance matrix computing means 7. Assuming that the output signals of the receivers 6 are S1, S2, . . . , SM, then a signal vector is given by the following expression 1.

$$S = \begin{pmatrix} S_1 \\ S_2 \\ \vdots \\ S_M \end{pmatrix} \quad (1)$$

The covariance matrix computing means 7 snapshoots the output signals from the receivers 6 P times, and computes a covariance matrix on the output signals, which is given by the following expression 2.

$$\sum_{k=1}^{P} SS^* = \begin{pmatrix} \sum_{k=1}^{P} S_1 S_1^* & \cdots & \sum_{k=1}^{P} S_1 S_M^* \\ \vdots & \ddots & \vdots \\ \sum_{k=1}^{P} S_M S_1^* & \cdots & \sum_{k=1}^{P} S_M S_M^* \end{pmatrix} \quad (2)$$

The covariance matrix of expression 2 constitutes an output signal of the covariance matrix computing means 7. In the expression, * represents conjugate or Hermitian conjugate.

The eigenvalue/eigenvector computing means 8 computes an M number of eigenvalues from the covariance matrix, then computes eigenvectors corresponding the eigenvalues, and outputs the results to the noise-subspace projection length computing means 9. Assuming that the eigenvalues are λ1 to λM and the eigenvectors are X1 to $X_M$, we have the following expression 3 as an output signal of the eigenvalue/eigenvector computing means 8 from the expression 2.

$$\sum_{k=1}^{P} SS^* = (X_1 \quad X_2 \quad \cdots \quad X_M) \begin{pmatrix} \lambda_1 & & & 0 \\ & \lambda_2 & & \\ & & \ddots & \\ 0 & & & \lambda_M \end{pmatrix} \begin{pmatrix} X_1^* \\ X_2^* \\ \vdots \\ X_M^* \end{pmatrix} \quad (3)$$

As seen, the covariance matrix takes the form of a positive definite matrix. In the positive definite matrix, the eigen values are all larger than zero (0). It is assumed that the noise quantities or figures of the receivers 6 are all equal to one another, and a standard deviation of the noise distribution is σ. Then, the following relation holds among the eigenvalues on the already-stated assumption that the D number of signals are not correlated.

$$\lambda_1 \geq \lambda_2 \geq \ldots \lambda_D \geq \lambda_{D+1} \geq \ldots = \lambda_M = \sigma^2 \quad (4)$$

A signal subspace defined by the eigenvectors $X_1$ to $X_D$, which correspond to the eigenvalues $\lambda_1$ to $\lambda_D$, is orthogonally complementary to a noise subspace defined by the eigenvectors $X_{D+1}$ to $X_M$, which correspond to the eigenvalues $\lambda_{D+1}$ to $\lambda_M$.

In a case where an M number of antennas 5 are arrayed and radio sources are located in the directions deviated at angles from the standard or reference direction, data of the M number of antenna output signals, i.e., mode vectors, are stored in the mode vector computing means 11. Usually, those angles are within a predetermined range of angles.

The mode vector computing means 11 computes and generates mode vectors within a range of angles at and near a position defined by a direction command containing an azimuth and an elevation, which is received from the control unit 12. The direction command is also sent to the instantaneous-field-of-view invariable rotation driver 14, from the control unit 12. The rotation driver 14 responds to the direction command, and turns the antenna platform 2 in the direction specified by the direction command.

Accordingly, the mode vector computing means 11 computes and generates a mode vector defined by an azimuth a and an elevation β, and sends the result to the noise-subspace projection length computing means 9. The noise-subspace projection length computing means 9 projects the mode vector to a noise subspace defined by the eigenvalues and the eigenvectors, which have been input thereto. The noise-subspace projection length computing means 9 produces a projection length given by an expression 5.

$$R_b = \left\| \begin{pmatrix} X_D & X_{D+1} & \cdots & X_M \end{pmatrix} \begin{pmatrix} X_D^* \\ X_{D+1}^* \\ \vdots \\ X_M^* \end{pmatrix} b(\alpha, \beta) \right\| \quad (5)$$

where a(α, β): mode vector.

The minimum projection-length computing means 10, while handling the projection length of the mode vector a(α, β) as the function of α and β, computes D sets of the values of α and β which locally minimize the projection length; (α1, β1), (α2, β2), . . . , (αD, βD).

Those values (α1, β1), (α2, β2), . . . , (αD, βD) are estimated angular values defining the directions in which the D number of radio sources are located.

The prior direction finder thus constructed suffers from the following problem. An attempt to increase the antenna aperture in order to improve the S/N (signal/noise) ratio of the output signal of each antenna, brings about an increase of the distance between the adjacent antennas. The result is that grating lobes is produced, and an imaginary radio source appears in the direction in which radio sources cannot be located.

SUMMARY OF THE INVENTION

The present invention has been made to solve the above problems with the prior art, and therefore an object of the present invention is to suppress the grating lobes in the prior direction finder.

According to a first aspect of the invention, there is provided a direction finder which comprises: a plural number of antennas for receiving radio waves from radio sources; an antenna platform having the plural number of antennas so mounted thereon that the antennas point to in the same direction; an instantaneous-field-of-view invariable rotation driver means for rotating the antenna platform by a given angle received thereby in response to a rotation angle command in a state that the plural number of antennas bear their directions fixedly; a control means for outputting a plural number of different rotation angle commands for transmission to the instantaneous-field-of-view invariable rotation driver means; receivers, coupled respectively with the plural number of antennas, for receiving the signals from the antennas; a covariance matrix computing means for computing a covariance matrix on the output signals of the receivers; an eigenvalue/eigenvector computing means for computing eigenvalues and eigenvectors from the covariance matrix output from the covariance matrix computing means; a mode vector computing means for computing a mode vector by use of the rotation angle command that is applied from the control means to the instantaneous-field-of-view invariable rotation driver means and an array of the plural number of antennas; a noise-subspace projection length computing means for projecting the mode vector output from the mode vector computing means into a subspace defined by the eigenvalues and eigenvectors output from the eigenvalue/eigenvector computing means, and for computing a projection length of the projected mode vector; a minimum projection-length computing means for computing azimuthal and elevation angles of the radio sources when the projection lengths output from the noise-subspace projection length computing means are locally minimized; and a cumulative angle detector for computing cumulative frequencies of the azimuthal and elevation angles in connection with the rotation angle commands that are issued from the control means to the instantaneous-field-of-view invariable rotation driver to rotate the antenna platform, and for outputting the azimuthal and elevation angles of the radio sources whose cumulative frequencies are greater than a predetermined cumulative frequency.

In a direction finder according to a second aspect of the invention, a time correlator is further provided between the minimum projection-length computing means and the cumulative angle detector in the arrangement of the direction finder of the first invention. In the direction finder thus arranged, the processings by the direction finder circuit ranging from the covariance matrix computing means to the minimum projection-length computing means are iteratively performed under the condition of different noise quantities of the receivers, and the correlations between the positions of the imaginary radio sources as the output signals of the minimum projection-length computing means are computed.

A direction finder defined by a third invention uses an instantaneous-field-of-view variable rotation driver in place of the instantaneous-field-of-view invariable rotation driver in the direction finder arrangement of the first invention. The instantaneous-field-of-view variable rotation driver rotates the antenna platform so as to vary the directions of the antennas.

In a direction finder defined by a fourth invention, a time correlator is further provided between the minimum projection-length computing means and the cumulative angle detector in the arrangement of the direction finder of the third invention. In the direction finder thus arranged, the processings by the direction finder circuit ranging from the covariance matrix computing means to the minimum projection-length computing means are iteratively performed under the condition of different noise quantities of the receivers, and the correlations between the positions of the imaginary radio sources as the output signals of the minimum projection-length computing means are computed.

BRIEF DESCRIPTION OF THE DRAWINGS

FIG. 5 is a block diagram showing a conventional direction finder;

FIG. 6 is a diagram showing an application of the direction finder of FIG. 5;

DETAILED DESCRIPTION OF THE PREFERRED EMBODIMENTS

Now, a description will be given in more detail of preferred embodiments of the invention with reference to the accompanying drawings.

Embodiment 1

Figure 1:
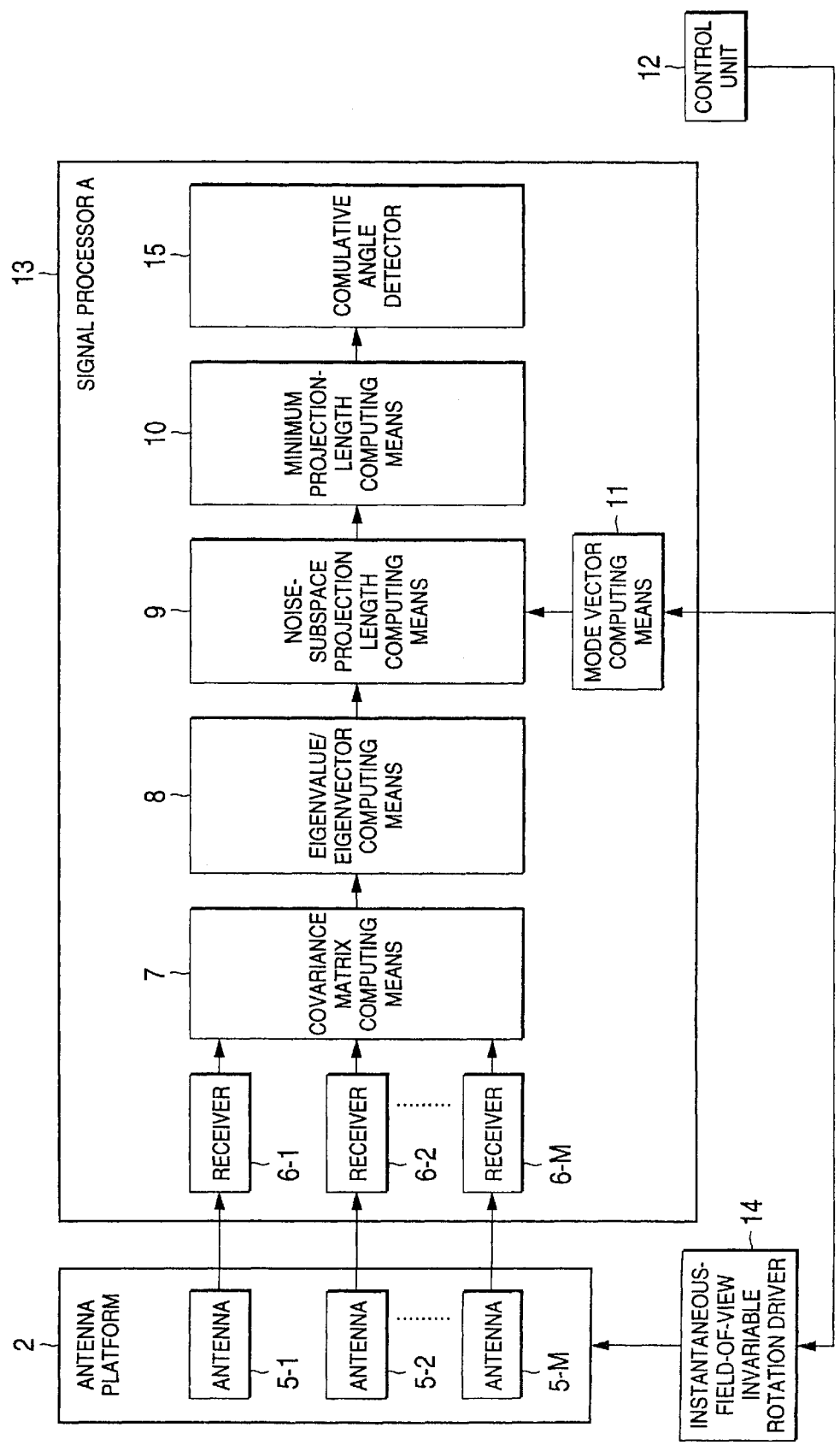
FIG. 1 is a block diagram showing a direction finder which constitutes an embodiment 1 of the present invention.

FIG. 1 is a block diagram showing a direction finder which constitutes an embodiment 1 of the present invention. In the figure, reference numeral 2 is an antenna platform; 5-1 to 5-M are antennas which have the same specifications, are fastened to the an antenna platform 2, and have the equal directivities in the same direction; 6-1 to 6-m are receivers which have the same specifications and are coupled with the antennas 5-1 to 5-M; 7 is a covariance matrix computing means which computes a covariance matrix on the output signals of the receivers 6-1 to 6-M; 8 is an eigenvalue/eigenvector computing means which computes and generates eigenvalues and eigenvectors from the covariance matrix output from the receivers 6-1 to 6-M; 9 is a noise-subspace projection length computing means which projects a mode vector into a noise subspace defined by the eigenvalues and the eigenvectors, and computes a projection length of the move vector; 10 is a minimum projection-length computing means which computes an azimuth and an elevation of the radio source when the projection length output from the noise-subspace projection length computing means 9 is locally minimized; 11 is a mode vector computing means for computing a mode vector; 12 is a control unit; 13 is a signal processor A 13; and 14 is an instantaneous-field-of-view invariable rotation driver which rotates the antenna platform 2 while setting the antennas 5 in a fixed direction.

The operation of the direction finder thus constructed will be described. A direction command containing an azimuth and an elevation, which is output from the control unit 12, is input to the instantaneous-field-of-view invariable rotation driver 14 which in turn rotates the antenna platform 2 to turn in the direction indicated by the direction command. Assumption is made here that a D number of radio sources are present in a simultaneous field of view of the antennas 5, and that the radio wave signals emitted from those radio sources are not correlated one another.

The radio waves emitted from the radio sources are received by the antennas 5-1 to 5-M (generally designated by 5), and then input to the receivers 6-1 to 6-M. The received signals are amplified and frequency converted in the receivers 6-1 to 6-M (generally designated by 6), and the thus processed signals are input to the covariance matrix computing means 7.

The mathematical expression of the output signals of the receivers is as given by expression 1 already referred to.

The covariance matrix computing means 7 computes a covariance matrix, given by expression 2, on the signals received by and output from the receivers 6, and sends the covariance matrix to the eigenvalue/eigenvector computing means 8. The eigenvalue/eigenvector computing means 8 computes and generates an M number of eigenvalues from the received covariance matrix; it computes eigenvectors corresponding to the eigenvalues; and it inputs those eigenvalues and eigenvectors to the noise-subspace projection length computing means 9.

Assuming that the eigenvalues are $\lambda_1$ to $\lambda_M$ and the eigenvectors are $X_1$ to $X_M$, the output signal of the eigenvalue/eigenvector computing means 8 is expressed by expression 3.

The expression 3 is a positive definite matrix, and hence, the eigen values are all larger than zero (0). The expression 4 holds among the eigenvalues on the already-stated assumption that the standard deviation of the noise distribution is $\sigma$ and the D number of signals are not correlated.

A signal subspace defined by the eigenvectors $X_1$ to $X_D$, which correspond to the eigenvalues $\lambda_1$ to $\lambda_D$, is orthogonally complementary to a noise subspace defined by the eigenvectors $X_{D+1}$ to $X_M$, which correspond to the eigenvalues $\lambda_{D+1}$ to $\lambda_M$.

The mode vector computing means 11 computes the mode vectors of the arrayed antennas 5-1 to 5-M, which are fastened to the antenna platform 2, and turned in the direction specified by a direction command containing an azimuth and an elevation, which is received from the control unit 12.

Figure 7:
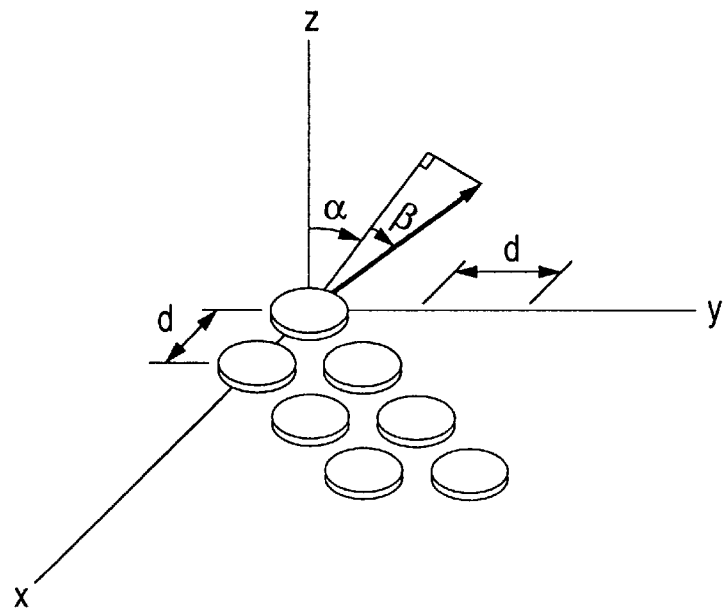
FIG. 7 is a diagram showing an array of antennas and a coordinates system defining the antenna array.

Let us consider an array of antennas defined by a coordinates system as shown in FIG. 7. As shown, the x and y axes two dimensionally define the plane of the antenna platform 2, and the z axis is vertical to the plane, viz., it represents the plane direction. Seven antennas 5 are arrayed at spatial intervals d in the x and y axes directions. The control unit 12 issues a direction command containing an azimuthal angle and an elevation angle to the instantaneous-field-of-view invariable rotation driver 14. The rotation driver 14 turns the antenna platform 2 in the direction indicated by the direction command.

The coordinates specifying the locations of the antennas 5 may be expressed by the following expression 6.

$$(0, 0)$$
$$(d, d)$$
$$(2d, 2d)$$
$$(3d, 3d)$$
$$(d, 0)$$
$$(2d, d)$$
$$(3d, 2d) \qquad (6)$$

It is assumed that a imaginary radio source is located in the direction angularly deviated by an azimuth $\alpha$ and an elevation $\beta$ from the z axis. The mode vector computing means 11 receives a direction command from the control unit 12 and computes a mode vector of the imaginary radio source. The mode vector is given by the following expression 7.

$$\begin{pmatrix} 1 \\ \exp\left[j\frac{2\pi}{\lambda}d\{(\cos\gamma + \sin\gamma)\sin\beta + (-\sin\gamma + \cos\gamma)\cos\beta\sin\alpha\}\right] \\ \exp\left[j\frac{2\pi}{\lambda}d\{(2\cos\gamma + 2\sin\gamma)\sin\beta + (-2\sin\gamma + 2\cos\gamma)\cos\beta\sin\alpha\}\right] \\ \exp\left[j\frac{2\pi}{\lambda}d\{(3\cos\gamma + 3\sin\gamma)\sin\beta + (-3\sin\gamma + 3\cos\gamma)\cos\beta\sin\alpha\}\right] \\ \exp\left[j\frac{2\pi}{\lambda}d\{\cos\gamma\sin\beta - \sin\gamma\cos\beta\sin\alpha\}\right] \\ \exp\left[j\frac{2\pi}{\lambda}d\{(2\cos\gamma + \sin\gamma)\sin\beta + (-2\sin\gamma + \cos\gamma)\cos\beta\sin\alpha\}\right] \\ \exp\left[j\frac{2\pi}{\lambda}d\{(3\cos\gamma + 2\sin\gamma)\sin\beta + (-3\sin\gamma + 2\cos\gamma)\cos\beta\sin\alpha\}\right] \end{pmatrix} \quad (7)$$

In the expression 7, γ represents an angle of the turn of the antennas 5 about the z axis (FIG. 7), and λ indicates a wavelength of a radio wave emitted from the imaginary radio source. The diagram of FIG. 7 is depicted on the assumption that the γ=0, and the initial value of γ is 0.

In the noise-subspace projection length computing means 9, a noise subspace is developed by use of the eigenvalues and eigenvectors output from the eigenvalue/eigenvector computing means 8, and the mode vector that is received from the mode vector computing means 11 is projected into the noise subspace. The noise-subspace projection length computing means 9 produces a projection length Rb, which is given by an expression 8

$$R_a = \left\| (X_D \ X_{D+1} \ \cdots \ X_M) \begin{pmatrix} X_D^* \\ X_{D+1}^* \\ \vdots \\ X_M^* \end{pmatrix} a(\alpha, \beta) \right\| \quad (8)$$

where b(α, β):mode vector.

The minimum projection-length computing means 10, while handling the projection length of the mode vector a(α, β) as the function of α and β, computes D sets of the values of α and β which locally minimize the projection length; (α11, β11), (α12, β12), . . . , (α1D, β1D).

γ=γ1 0 is set up by the control unit 12, and the mode vector given by expression 7 is applied from the mode vector computing means 11 to the noise-subspace projection length computing means 9.

The control unit 12 sends a rotation angle γ1 to the rotation driver 4, which in turn rotates the antenna platform 2 about the z axis by the angle γ1.

The sequence of the signal processings performed by the direction finder circuit ranging from the antennas 5 to the minimum projection-length computing means 10 is repeated to obtain D sets of α and β values (α21, β21), (α22, β22), . . . , (α2D, β2D).

If the sequence of the signal processings is repeated J times, then DJ sets of α and β values are produced and then input to a cumulative angle detector 15.

The cumulative angle detector 15 computes cumulative frequencies of the DJ number of (α, β) values, and outputs the (α, β) values whose cumulative frequencies are each greater than a predetermined cumulative frequency.

An cumulative frequency AF of the output signals (αi1, βi1), (αi2, βi2), . . . , (αiD, βiD) from the minimum projection-length computing means 10 is computed by use of the following expression 9 in the cumulative angle detector 15.

$$AF = \sum_{m=0}^{K-1} \sum_{n=0}^{L-1} H(m, n) \cdot U(\alpha_0 + m \cdot \Delta\alpha, \beta_0 + n \cdot \Delta\beta) \quad (9)$$

where i=1, 2, . . . , j.

Figure 8:
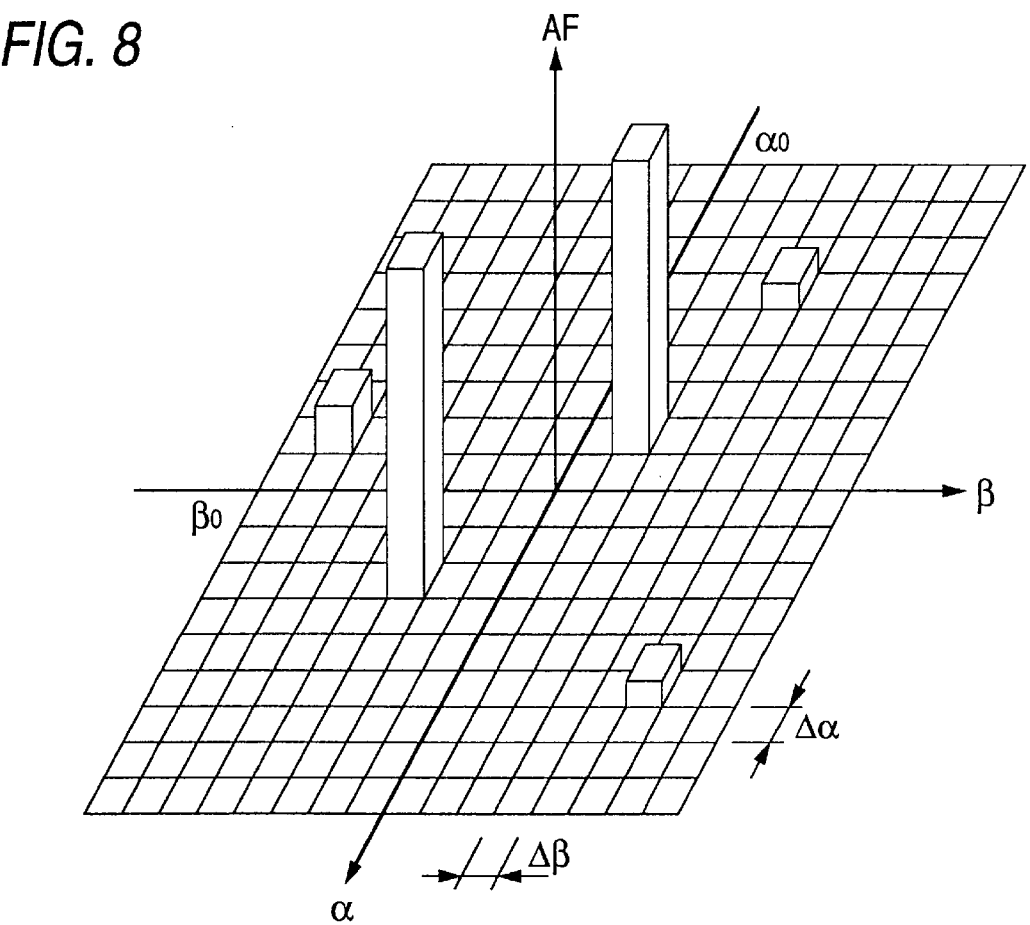
FIG. 8 is a diagrammatic representation of a distribution of cumulative frequencies of measured angles, obtained by the direction finder of the invention.

In the expression 9, α0 is an initial value of the azimuth in the cumulative frequency distribution; β0 is an initial value of the elevation in the cumulative frequency distribution; Δα is the width of the azimuth; and Δβ is the width of the elevation. U(α0+m·Δα, β+n·Δβ) is a function which produces 1 in a region defined by α0+m·Δα≦α<α0+(n+1)·Δα in the azimuth, and in a region defined by β0+n·Δβ≦β<β0+(n+1)·Δβ in the elevation. H(m, n) is an amplitude of U(α0+m·Δα, β0+n·Δβ), or an cumulative frequency in the regions of α0+m·Δα≦α<α0+(n+1)·Δα and β0+n·Δβ≦β<β0+(n+1)·Δβ. K and L are the widths Δα and Δβ of the azimuth and the elevation. A diagrammatic illustration of the expression 9 is as shown FIG. 8.

Provision of the cumulative angle detector 15 in the present embodiment prevents the cumulative frequencies from being dispersed, if the Δα and Δβ values are properly selected. Therefore, measuring values may be cumulated in the vicinity of the truth value, and hence it is easy to estimate the truth value.

With provision of the instantaneous-field-of-view invariable rotation driver 14, this embodiment may suppress the adverse effect by the grating lobes by merely turning the antenna platform 2 having the antennas 5 fastened thereonto in a state that an array factor of the array of the antennas 5 remains unchanged and the number of the antennas 5 and the array of them are not changed and altered. As a result, there is no need of switching the antennas 5 and increasing the number of the antennas 5.

Embodiment 2

Figure 2:
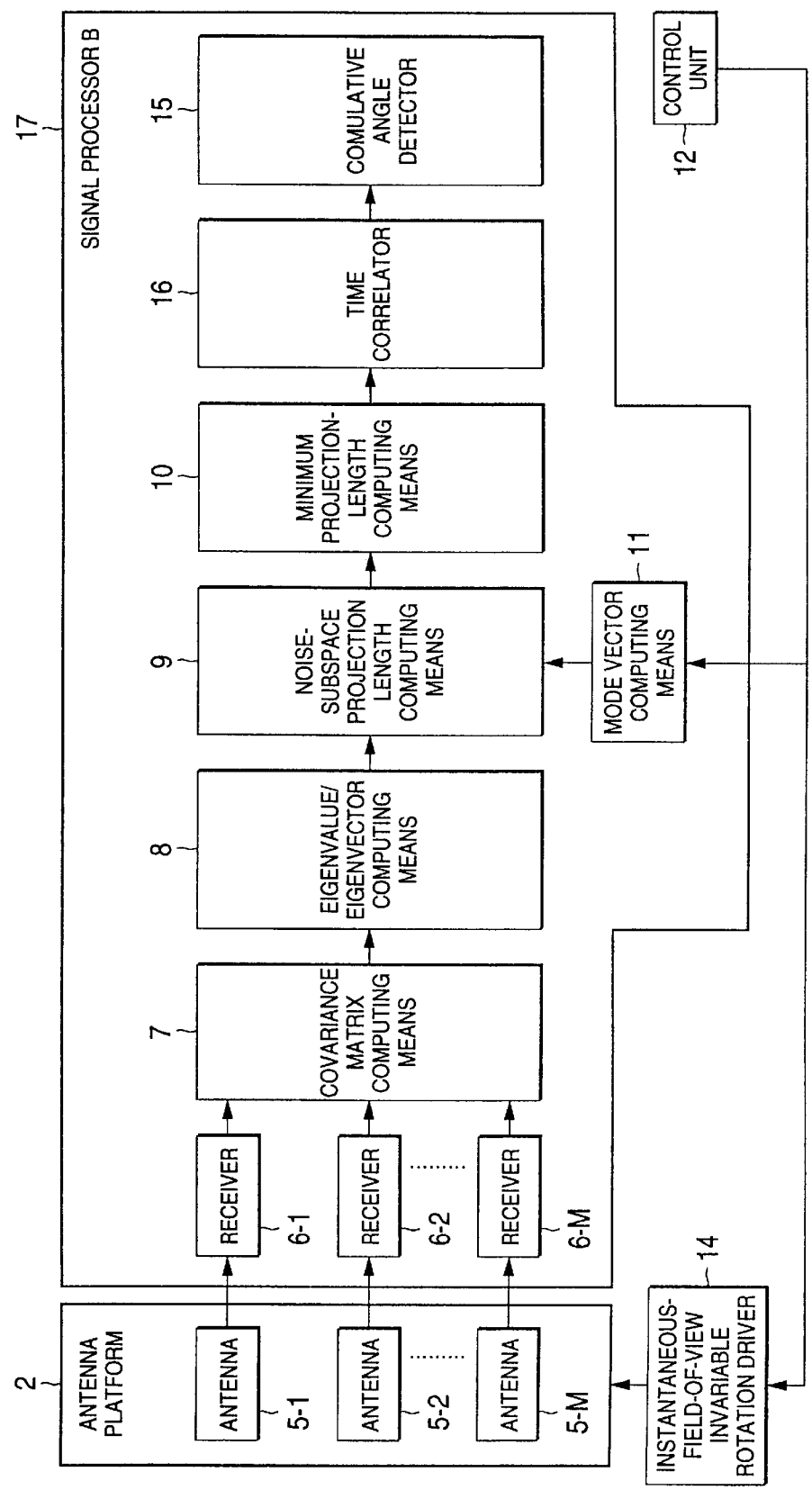
FIG. 2 is a block diagram showing a direction finder which constitutes an embodiment 2 of the present invention.

FIG. 2 is a block diagram showing a direction finder which constitutes an embodiment 2 of the present invention. In the figure, a time correlator 16 repeats, under the condition of different noise quantities of the receivers 6, the sequence of the signal processings that is performed by the direction finder circuit ranging from the covariance matrix computing means 7 to the minimum projection-length computing means 10, and obtains the correlations between the angles of the locations of the imaginary radio sources as the output signals of the minimum projection-length computing means 10. The remaining arrangement of the direction finder of the embodiment 2 is substantially the same as the corresponding one in FIG. 1.

The operation of the direction finder thus constructed will be described. The processings performed by the direction finder circuit ranging from the antennas 5 to the minimum projection-length computing means 10 are the same as those performed by the corresponding signal processing route in the embodiment 1.

The minimum projection-length computing means 10 repeats the outputting of its output signals under the condition of different noise quantities of the receivers 6, and the time correlator 16 receives the output signals of the minimum projection-length computing means 10 and computes the correlations between those output signals.

More specifically, the time correlator 16 computes the correlations between the output signals (α1, β1), (α2, β2), . . . , (αD, βD) under a noise quantity of the receivers 6 and the output signals (α1, β1)', (α2, β2)', . . . , (αD, βD)', (α1, β1)", (α2, β2)", . . . , (αD, βD)" under another noise quantity of the receivers 6, and produces only the angles that are equal to each other.

Through the same processing as in the embodiment 1 already described, the cumulative angle detector 15 computes an cumulative frequency of the sets of ($\alpha$, $\beta$) values for various rotation angles $\gamma$, and produces the sets of the ($\alpha$, $\beta$) values whose cumulative frequencies are greater than a predetermined one.

Embodiment 3

Figure 3:
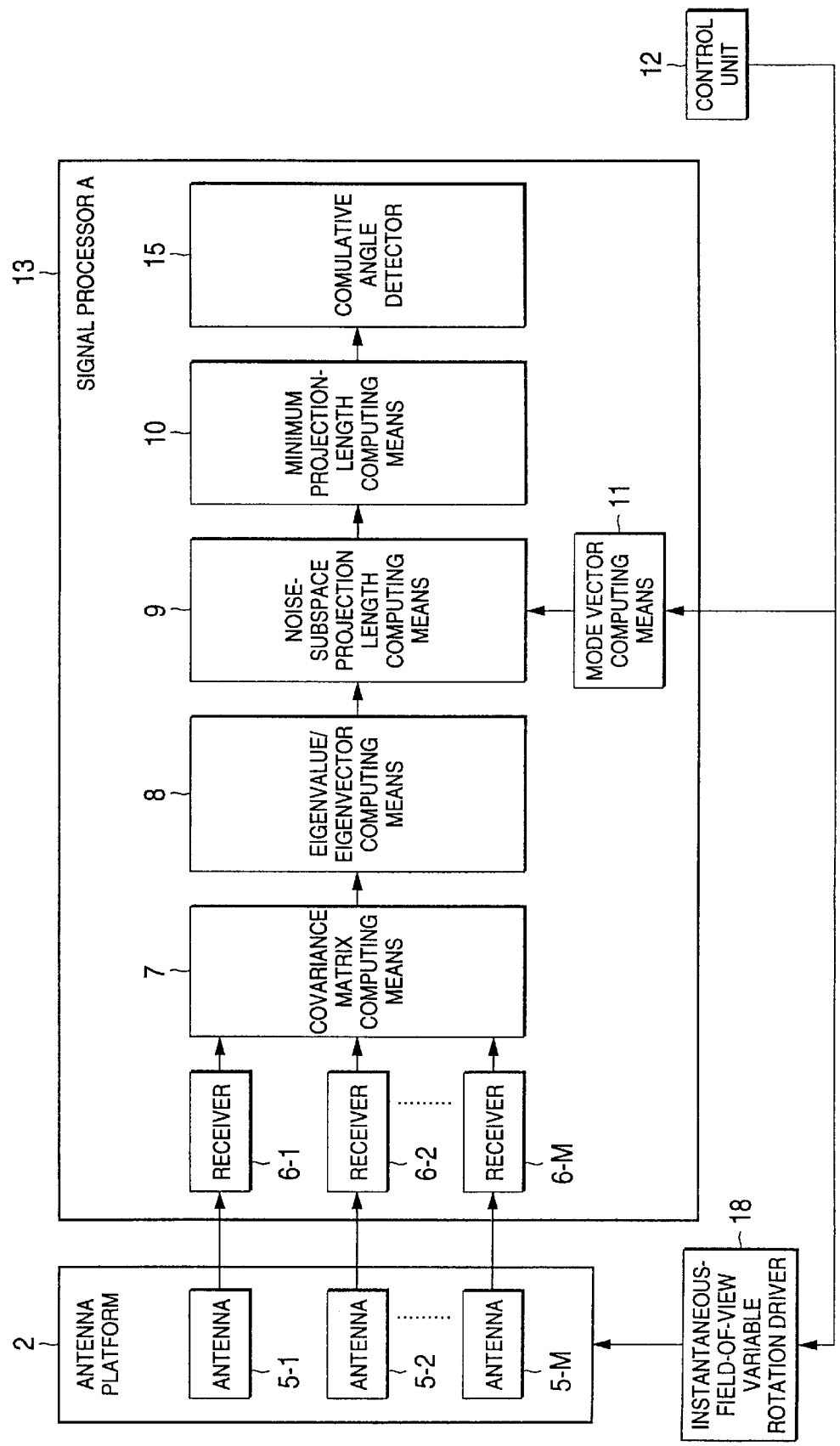
FIG. 3 is a block diagram showing a direction finder which constitutes an embodiment 3 of the present invention.

FIG. 3 is a block diagram showing a direction finder which constitutes an embodiment 3 of the present invention. In the direction finder of this embodiment, an instantaneous-field-of-view variable rotation driver 18 orientates the plane direction (z axis) of the antenna platform 2 in a predetermined direction, and then slightly deviates the plane direction from the predetermined direction. The remaining arrangement of the direction finder of the embodiment 3 is substantially the same as the corresponding one in FIG. 1.

The operation of the direction finder will be described. The instantaneous-field-of-view variable rotation driver 18 receives a direction command from the control unit 12, and turns the antenna platform 2 in a predetermined direction.

The mode vector computing means 11 also receives the direction command from the control unit 12 and computes the mode vectors corresponding to the imaginary radio sources located in the predetermined direction in which the antenna platform 2 is turned.

The signal processings performed in the direction finder circuit ranging from the antennas 5 to the minimum projection-length computing means 10 are the same as in the embodiment 1. The control unit 12 issues a direction command to the instantaneous-field-of-view variable rotation driver 18. The rotation driver 18 angularly deviates the plane direction of the antenna platform 2 from the direction that is initially set.

The processings performed by the direction finder circuit ranging from the antennas 5 to the minimum projection-length computing means 10 are repeated again. The cumulative angle detector 15 computes cumulative frequencies of the angles of the radio sources by use of the results of the iterative processings, and produces the angles whose cumulative frequencies are greater than a predetermined one.

Embodiment 4

Figure 4:
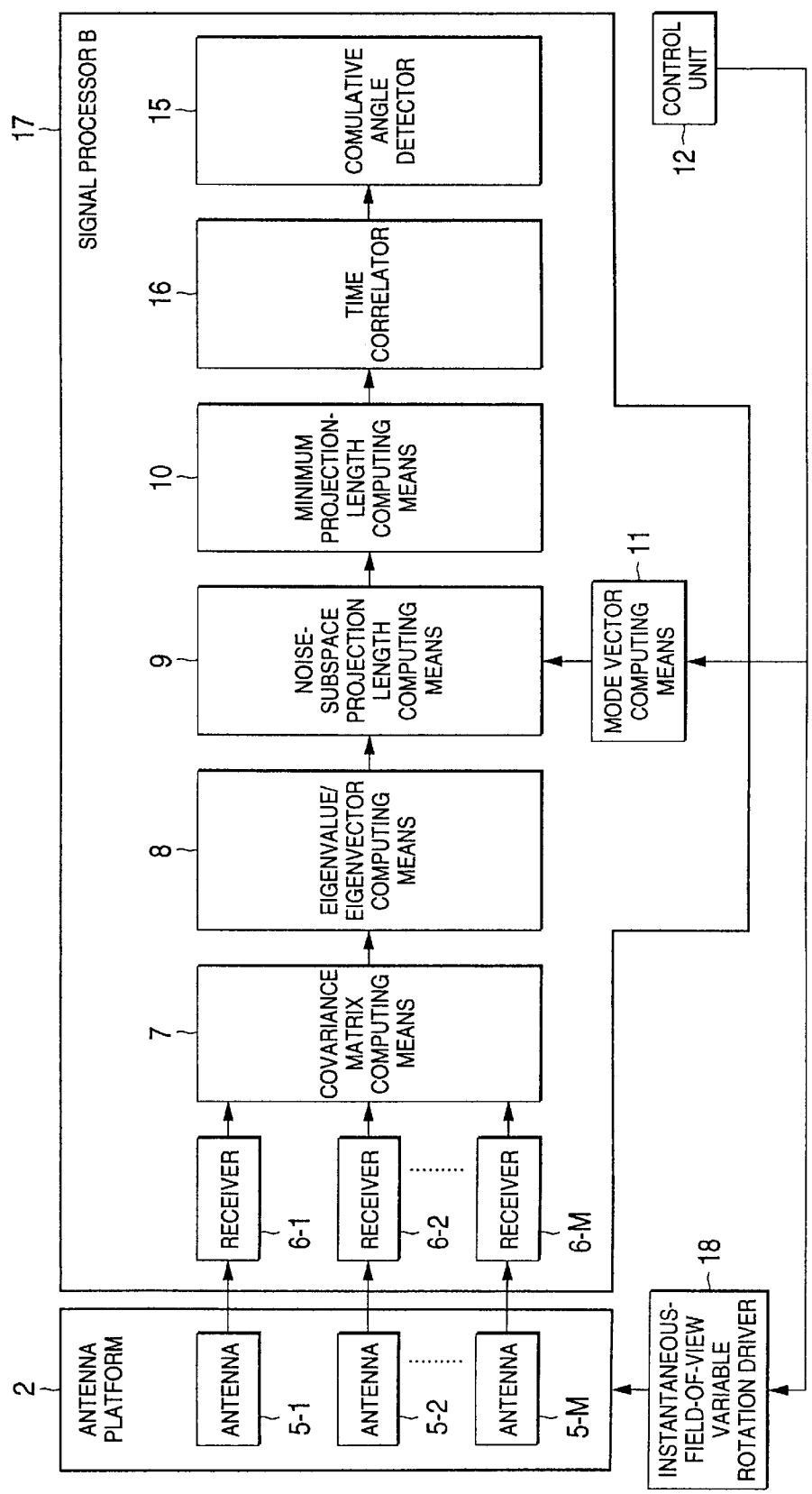
FIG. 4 is a block diagram showing a direction finder which constitutes an embodiment 4 of the present invention.

FIG. 4 is a block diagram showing a direction finder which constitutes an embodiment 4 of the present invention. In the figure, a time correlator 16 repeats, under the condition of different noise quantities of the receivers 6, the sequence of the signal processings that is performed by the direction finder circuit ranging from the covariance matrix computing means 7 to the minimum projection-length computing means 10, and obtains the correlations among the angles of the locations of the imaginary radio sources as the output signals of the minimum projection-length computing means 10. The remaining arrangement of the direction finder of the embodiment 2 is substantially the same as the corresponding one in FIG. 3.

The operation of the direction finder thus constructed will be described. The processings performed by the direction finder circuit ranging from the antennas 5 to the minimum projection-length computing means 10 are the same as in the embodiment 3.

The operation of the time correlator 16 is the same as the corresponding one in the embodiment 2.

In a direction finder defined by a first invention, an instantaneous-field-of-view invariable rotation driver responds to a direction command issued by the control unit to turn an antenna platform in the direction as commanded. A mode vector computing means responds to the same direction command from the control unit to compute mode vectors based on the direction command. A cumulative angle detector computes cumulative frequencies of the obtained angles of the radio sources. The direction finder thus constructed and operated can suppress the adverse effect by the grating lobes caused by the array of the antennas, viz., a phenomenon that the direction finder mistakenly recognizes imaginary radio sources as if those are real radio sources.

A direction finder defined by a second invention additionally uses a time correlator in the direction finder arrangement of the first invention. The direction finder of the second invention improves an angle measuring accuracy and further suppress the adverse effect arising from the antenna array.

In a direction finder defined by a third invention, an instantaneous-field-of-view variable rotation driver responds to a direction command issued from the control unit, and turns an antenna platform in the direction as commanded while varying the direction of the antennas. A mode vector computing means responds to the rotation angle command issued from the control unit to compute mode vectors based on the commands. A cumulative angle detector computes cumulative frequencies of the obtained angles of the radio sources. The direction finder thus constructed and operated can suppress the adverse effect by the grating lobes caused by the array of the antennas.

A direction finder defined by a fourth invention additionally uses a timer correlator in the direction finder arrangement of the third invention. The direction finder of the second invention improves an angle measuring accuracy and further suppress the adverse effect arising from the antenna array.

What is claimed is:

1. A direction finder comprising:
   a plural number of antennas for receiving radio waves from radio sources;
   an antenna platform having said plural number of antennas so mounted thereon that said antennas point to in the same direction;
   an instantaneous-field-of-view invariable rotation driver means for rotating said antenna platform by a given angle received thereby in response to a rotation angle command in a state that said plural number of antennas bear their directions fixedly;
   a control means for outputting a plural number of different rotation angle commands for transmission to said instantaneous-field-of-view invariable rotation driver means;
   receivers, coupled respectively with said plural number of antennas, for receiving the signals from said antennas;
   a covariance matrix computing means for computing a covariance matrix on the output signals of said receivers;
   an eigenvalue/eigenvector computing means for computing eigenvalues and eigenvectors from the covariance matrix output from said covariance matrix computing means;
   a mode vector computing means for computing a mode vector by use of said rotation angle command that is applied from said control means to said instantaneous-field-of-view invariable rotation driver means and an array of said plural number of antennas;

a noise-subspace projection length computing means for projecting the mode vector output from said mode vector computing means into a subspace defined by said eigenvalues and eigenvectors output from said eigenvalue/eigenvector computing means, and for computing a projection length of the projected mode vector;

a minimum projection-length computing means for computing azimuthal and elevation angles of said radio sources when the projection lengths output from said noise-subspace projection length computing means are locally minimized; and a cumulative angle detector for computing cumulative frequencies of the azimuthal and elevation angles in connection with said rotation angle commands that are issued from said control means to said instantaneous-field-of-view invariable rotation driver to rotate said antenna platform, and for outputting the azimuthal and elevation angles of said radio sources whose cumulative frequencies are greater than a predetermined cumulative frequency.

2. A direction finder as claimed in claim 1, further comprising: a time correlator for computing, under the condition of different noise quantities of said receivers, the correlations between the azimuthal angles and the elevation angles of said radio sources that are derived from said minimum projection-length computing means.

3. A direction finder comprising:

a plural number of antennas for receiving radio waves from radio sources;

an antenna platform having said plural number of antennas so mounted thereon that said antennas point to in the same direction;

an instantaneous-field-of-view variable rotation driver means for rotating, in response to a rotation angle command received thereby, said antenna platform by a given angle to vary the directions of said antennas;

a control means for outputting a plural number of different rotation angle commands for transmission to said instantaneous-field-of-view variable rotation driver means;

receivers, coupled respectively with said plural number of antennas, for receiving the signals from said antennas;

a covariance matrix computing means for computing a covariance matrix on the output signals of said receivers;

an eigenvalue/eigenvector computing means for computing eigenvalues and eigenvectors from the covariance matrix output from said covariance matrix computing means;

a mode vector computing means for computing a mode vector by use of said rotation angle command that is applied from said control means to said instantaneous-field-of-view variable rotation driver means and an array of said plural number of antennas;

a noise-subspace projection length computing means for projecting the mode vector output from said mode vector computing means into a subspace defined by said eigenvalues and eigenvectors output from said eigenvalue/eigenvector computing means, and for computing a projection length of the projected mode vector;

a minimum projection-length computing means for computing azimuthal and elevation angles of said radio sources when the projection lengths output from said noise-subspace projection length computing means are locally minimized; and a cumulative angle detector for computing cumulative frequencies of the azimuthal and elevation angles in connection with said rotation angle commands that are issued from said control means to said instantaneous-field-of-view variable rotation driver to rotate said antenna platform, and for outputting the azimuthal and elevation angles of said radio sources whose cumulative frequencies are greater than a predetermined cumulative frequency.

4. A direction finder as claimed in claim 3, further comprising:

a time correlator for computing, under the condition of different noise quantities of said receivers, the correlations between the azimuthal angles and the elevation angles of said radio sources that are derived from said minimum projection-length computing means.

* * * * *